US009185036B2

(12) United States Patent
Malhotra

(10) Patent No.: US 9,185,036 B2
(45) Date of Patent: Nov. 10, 2015

(54) METHOD AND APPARATUS FOR FLOW CONTROL OF DATA IN A NETWORK

(75) Inventor: Richa Malhotra, Enschede (NL)

(73) Assignee: Alcatel Lucent, Boulogne-Billancourt (FR)

( * ) Notice: Subject to any disclaimer, the term of this patent is extended or adjusted under 35 U.S.C. 154(b) by 1967 days.

(21) Appl. No.: 11/088,073

(22) Filed: Mar. 23, 2005

(65) Prior Publication Data
US 2006/0215550 A1 Sep. 28, 2006

(51) Int. Cl.
H04L 12/801 (2013.01)
H04L 12/825 (2013.01)
H04L 12/823 (2013.01)

(52) U.S. Cl.
CPC ............... H04L 47/10 (2013.01); H04L 47/11 (2013.01); H04L 47/17 (2013.01); H04L 47/263 (2013.01); H04L 47/32 (2013.01)

(58) Field of Classification Search
CPC .......... H04L 47/10; H04L 47/11; H04L 47/32
USPC ........... 370/229–231, 235–236, 236.1, 236.2, 370/253, 312, 349, 389, 471, 395.71
See application file for complete search history.

(56) References Cited

U.S. PATENT DOCUMENTS

| 6,148,005 | A  | * | 11/2000 | Paul et al. | 370/469 |
|---|---|---|---|---|---|
| 6,219,339 | B1 | * | 4/2001 | Doshi et al. | 370/235 |
| 6,222,839 | B1 | * | 4/2001 | Nakazaki et al. | 370/352 |
| 6,418,119 | B1 | * | 7/2002 | Hatta et al. | 370/235 |
| 6,424,620 | B1 | * | 7/2002 | Nishihara | 370/229 |
| 6,463,035 | B1 | * | 10/2002 | Moore | 370/236 |
| 6,556,541 | B1 | * | 4/2003 | Bare | 370/235 |
| 6,636,510 | B1 | * | 10/2003 | Lee et al. | 370/390 |
| 6,650,618 | B1 | * | 11/2003 | Peng et al. | 370/229 |
| 6,751,195 | B1 | * | 6/2004 | Watanabe | 370/236.1 |
| 6,754,222 | B1 | * | 6/2004 | Joung et al. | 370/412 |
| 6,771,601 | B1 | * | 8/2004 | Aydemir et al. | 370/231 |
| 7,180,857 | B2 | * | 2/2007 | Kawakami et al. | 370/231 |
| 7,240,124 | B2 | * | 7/2007 | Schwartz et al. | 709/238 |
| 7,283,476 | B2 | * | 10/2007 | Bare | 370/236 |
| 7,369,498 | B1 | * | 5/2008 | Ma et al. | 370/235 |
| 2001/0012269 | A1 | * | 8/2001 | Nakamura et al. | 370/230 |
| 2002/0103911 | A1 | * | 8/2002 | Meifu et al. | 709/227 |
| 2002/0136163 | A1 | * | 9/2002 | Kawakami et al. | 370/229 |
| 2003/0076781 | A1 | * | 4/2003 | Enomoto et al. | 370/229 |
| 2003/0081546 | A1 | * | 5/2003 | Agrawal et al. | 370/229 |
| 2003/0107994 | A1 | * | 6/2003 | Jacobs et al. | 370/235 |
| 2003/0133406 | A1 | * | 7/2003 | Fawaz et al. | 370/229 |
| 2004/0037276 | A1 | * | 2/2004 | Henderson et al. | 370/371 |
| 2004/0073641 | A1 | * | 4/2004 | Minhazuddin et al. | 709/223 |
| 2004/0179470 | A1 | * | 9/2004 | Nguyen et al. | 370/216 |
| 2005/0052994 | A1 | * | 3/2005 | Lee | 370/230 |
| 2005/0100031 | A1 | * | 5/2005 | Choe et al. | 370/404 |

(Continued)

Primary Examiner — Xavier Szewai Wong
(74) Attorney, Agent, or Firm — Wall & Tong, LLC

(57) ABSTRACT

A method of controlling data flow in a network includes detecting a congestion condition in the network, sending a congestion message to one or more nodes upstream of the congestion condition, learning address information of one or more nodes pertaining to the congestion condition, sending another congestion message containing these learned MAC addresses and, via the nodes receiving the congestion message with the MAC addresses, controlling a flow of data associated with the learned address information from the congestion message. The learned address information may be the MAC address of a destination node to which the data is flowing towards or a MAC address pair of the nodes between which the data is flowing.

24 Claims, 4 Drawing Sheets

(56) References Cited

U.S. PATENT DOCUMENTS

| | | | |
|---|---|---|---|
| 2005/0190754 A1* | 9/2005 | Golikeri et al. | 370/383 |
| 2006/0092840 A1* | 5/2006 | Kwan et al. | 370/230.1 |
| 2007/0058536 A1* | 3/2007 | Vaananen et al. | 370/230 |

\* cited by examiner

METHOD AND APPARATUS FOR FLOW CONTROL OF DATA IN A NETWORK

FIELD OF THE INVENTION

The present invention relates to computer networks such as LANs (local area networks), and more particularly to an intelligent method for reducing network congestion via using messages propagated upstream from congestion related nodes.

DESCRIPTION OF THE BACKGROUND ART

In networks, data is typically exchanged between communicating devices in the form of "frames." Frames include a source MAC address and a destination MAC address. A MAC address uniquely identifies a network device in a "Layer 2" communication protocol used in Ethernet and Token Ring LANs. A routing device (i.e., switch, bridge, or the like) connected between communicating devices uses the destination MAC address in an incoming frame generated by a source device and forwards the frame to the appropriate destination device.

Flow control of such frame-based data in a network using Ethernet protocol is achieved by either dropping packets or with a congestion avoidance mechanism such as back-pressure or pause. Either of these mechanisms is executed in a hop-by-hop method. A node in the network experiencing the congestion condition reacts in a manner such that a node that is upstream of the congested node receives a back-pressure or pause message that stops all transmission towards such congested node. Unfortunately, this type of messaging can propagate further in the network. That is, a distinction cannot be made among the different data flows between various nodes as to which flow is the cause of the congestion. Additionally, the back-pressure method may also propagate in such a way as to throttle traffic which might not be passing the congested node. Accordingly, Ethernet is inherently incapable of differentiating between problematic and acceptable traffic flows or streams in a network. In other words, Ethernet has no selective flow mechanism or capabilities.

This condition is further aggravated when Ethernet bridges are used to connect nodes (via pathways) because Ethernet bridges learn every MAC address that is passing therethrough. The Ethernet bridge is not capable of determining whether such MAC address resides one hop away or several hops away in another portion of the network either of which may or may not be contributing to part of the congestion pathways.

SUMMARY OF THE INVENTION

These and other deficiencies of the prior art are addressed by the present invention of a method of controlling data flow in a network. The method includes the steps of detecting a congestion condition in the network, sending a congestion message to one or more nodes upstream of the congestion condition, learning address information of one or more nodes pertaining to the congestion condition, broadcasting or advertising to other nodes the learned information such as MAC addresses pertaining to the congestion condition and controlling a flow of data based on the learned address information. The learning and advertising method helps distinguish problematic congestion causing flows from the non-congestion causing flows, thus leading to intelligent differentiation in flow control.

In one embodiment of the invention, the learned address information is the MAC address of a destination node to which the data is flowing towards. In another embodiment, the learned address information is the MAC address of a source node generating the data flow. In another embodiment, the learned address information is a MAC address pair of the nodes between which the data is flowing. The method may be practiced in for example a computer readable medium containing a program which, when executed, performs an operation of controlling data flow in the prescribed manner. As a result, data flows causing congestion are differentiated from data flows that are not causing congestion allowing improved performance of Ethernet-based networks.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of improving data flow in Ethernet based networks and, more specifically, to Ethernet based networks having the particular ability to manage flow control based on the differentiation of data flows by virtue of their MAC addresses. It will be appreciated by those skilled in the art that the invention is applicable to other network topologies and data flow methodologies where the management if distinct data flows is desirable.

Generally speaking, a method according to one embodiment of the invention for controlling data flow in a network includes detecting a congestion condition in the network, sending a congestion message to one or more nodes upstream of the congestion condition, learning address information of one or more end nodes or stations pertaining to the congestion condition sending another congestion message containing these learned MAC addresses and (the nodes receiving this congestion message with the MAC addresses) controlling a flow of data of the learned address information is the congestion message. The learned address information is the MAC address of a destination node to which the data is flowing towards or is a MAC address pair of the nodes between which the data is flowing.

Figure 1:
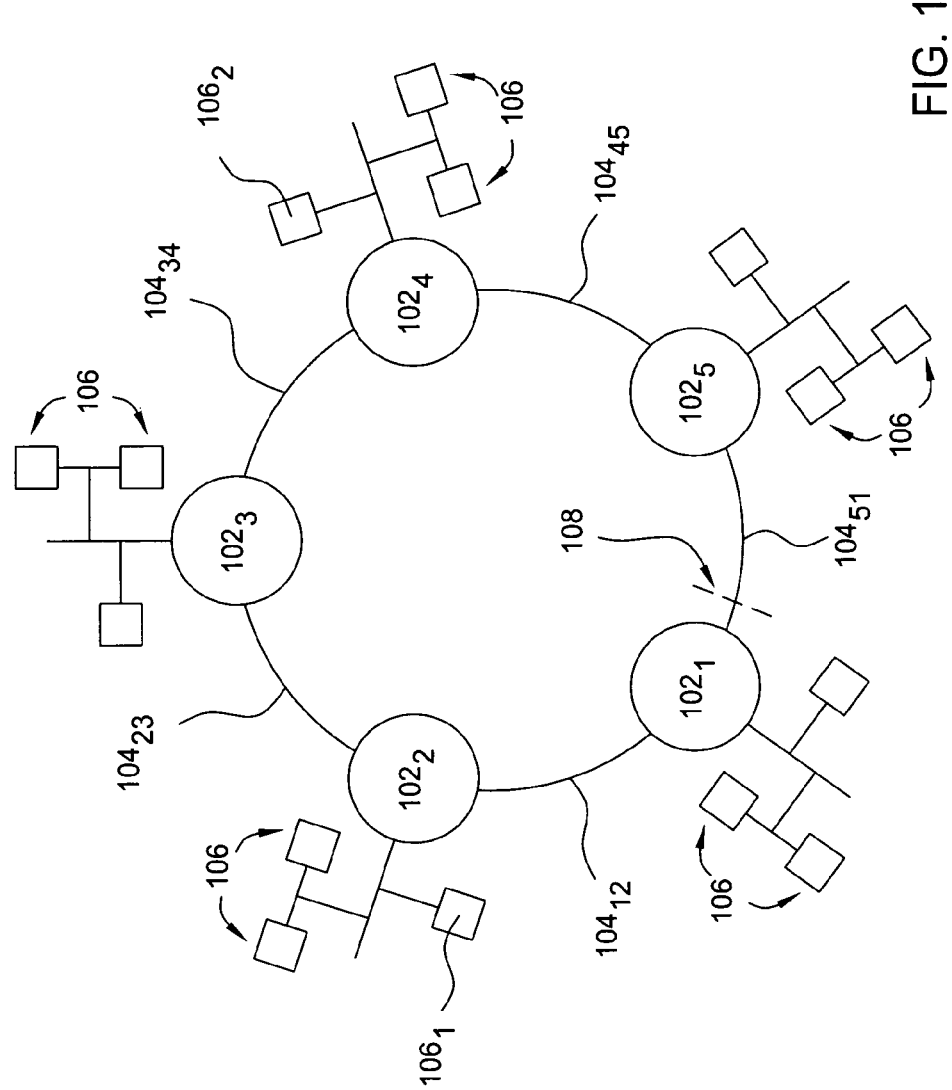
FIG. 1 depicts an exemplary network operating in accordance with the method of the subject invention.

FIG. 1 shows an example of a typical network configuration 100. Network devices 106 are connected by physical medium (represented as a plurality of links $104_N$) such as personal computers, servers, terminals for data entry and display, printers and the like, to a plurality of nodes $102_N$. The nodes $102_N$ represent specific network devices such as bridges, switches, routers, and hubs/repeaters (not shown). Data generated by end users of the network devices 106 travels across the network 100 to other end users via the physical medium and the nodes, which perform the processing necessary to ensure the data arrives in a usable condition to the proper recipient. For example, information passing from a first network device $106_1$ connected to a second node $102_2$ passes information to a second network device $106_2$ which is connected to a fourth node $102_4$. Interconnection between first node $102_2$ and fourth node $102_4$ is accomplished, for example and in one potential pathway, through a third node $102_3$ and interconnecting links $104_{2-3}$ and $104_{3-4}$.

In general, bridges and switches (at any one or all of the network nodes $102_n$) transfer data frames, by filtering, flooding or forwarding the data frames. Filtering refers to dropping or discarding a received data frame when processing the MAC addresses associated with such data frames according to a set of rules. Flooding refers to forwarding a data frame to all ports of a network device having a given destination address, when the address has not been previously learned (and thus unrecognized). Forwarding refers to sending an incoming data frame having a learned MAC address to the corresponding known port or ports of the next (or formal destination) node.

As noted above, MAC addresses uniquely identify a network device in a Layer 2 communication protocol. The Layer 2 protocol may be viewed as occupying a level in a "protocol stack" of established, commonly-used communication standards, beginning with a Layer 1, representing the physical medium used to transfer data, followed by Layer 2, then by a Layer 3 and 4 and so on. Generally speaking, the layers above Layer 2 handle exchanges between network entities where the exchanges require more processing than at the lower levels.

Figure 2:
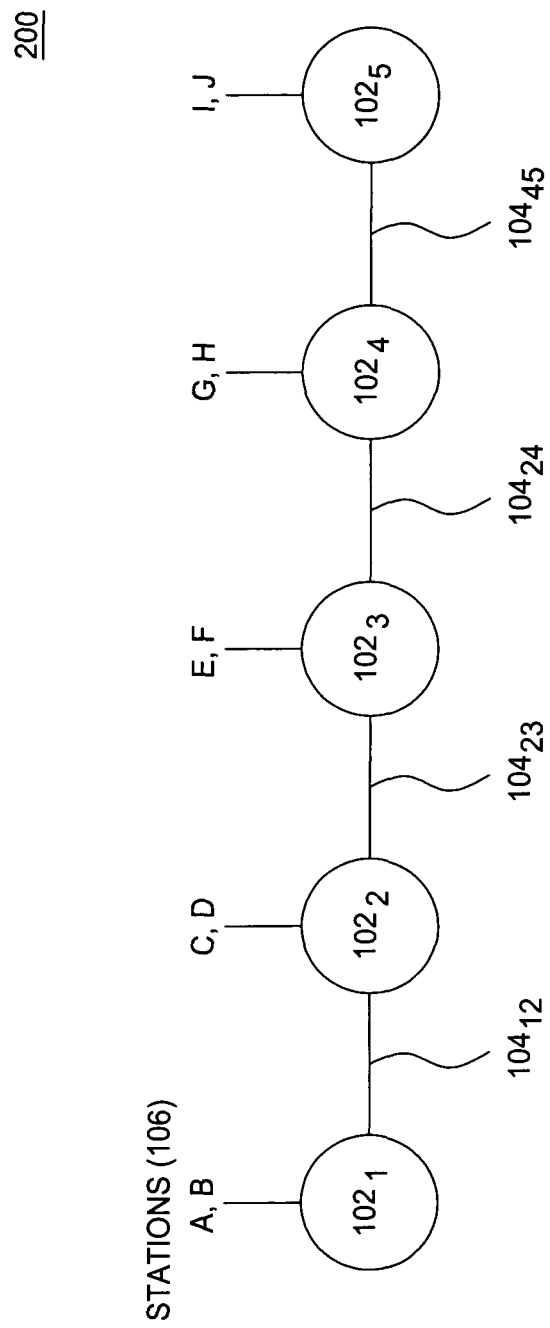
FIG. 2 depicts a logical topology of the exemplary network of FIG. 1.

As is known and understood, Ethernet bridges cannot operate within loop environments (such as the network 100 as shown in FIG. 1). Therefore, a spanning tree protocol (well known in the art and disclosed in the Ethernet Protocol Communications Standard 802.1D) is used to create a representative environment that is free of loops. Such a representative environment is shown in FIG. 2 as topology 200. Specifically, the plurality of nodes $102_N$ are linearly connected with the distinction of a break 108 (see FIG. 1) in network 100 being created to establish the new topology. In such a new topology, interconnecting links $104_N$ continue to connect the plurality of nodes $102_N$ with the exception of the link $104_{5-1}$ that would otherwise join a fifth node $102_5$ and the first node $102_1$. Network devices 106 are further represented as stations. In this particular example, and for sake of clarity, two such network devices or stations 106 are represented by call letters at each of the plurality of nodes $102_N$. Specifically, first node $102_1$ is connected to stations A and B. Second node $102_2$ is connected to stations C and D. Third node $102_3$ is connected to stations E and F. Fourth node $102_4$ is connected to stations G and H. Fifth node $102_5$ is connected to stations I and J.

In a representative example, consider that data traffic is moving from one station to another station and sharing the nodes and interconnecting links with other data traffic moving to other stations along the same nodes and links. Exemplary traffic rates are for example:

Traffic AG=50 Mbps
Traffic BC=50 Mbps
Traffic CG=40 Mbps
Traffic DE=10 Mbps
Traffic FG=30 Mbps If each of the links $104_N$ has a link capacity of 100 Mbps, then it is realized that third link $104_{3-4}$ is congested as the total traffic attempting to travel over this link is 100 Mbps with the final destination being the network device 106 located at station G. In other words, and with specific reference to the presented example, it is observed that traffic moving from station A to station G does so at a rate of 50 Mbps. Traffic moving from station C to station G travels at a rate of 40 Mbps, and traffic moving from station F to station G travels at a rate of 30 Mbps for a total of 120 Mbps which is in excess of the link capacity of third link $104_{3-4}$.

In accordance with an embodiment of the invention, the third node $102_3$ will detect this congestion condition and will have to limit or otherwise control the amount of data traveling over the third link $104_{3-4}$. That is, the third node $102_3$ (or other similar node detecting a congestion condition) will send a congestion message upstream (back towards nodes from which data is being sent). Based on information contained within the congestion message sent upstream, the upstream nodes can control future downstream traffic that is causing the congestion rather than the node detecting the congestion dropping packets from traffic flows coming into the node, which disrupts all communication.

One option for the congested node is to drop excess packets for the complete aggregate leading to unfair division in bandwidth. It is known for the Ethernet that in this case stations/nodes closest to the congested node will grab most of the capacity. Other congestion control schemes such as backpressure/pause frames will again act on the aggregate and propagate further into the network. This will end up disrupting traffic for flows which are not causing congestion, for example traffic from B to C and traffic from D to E. According to the invention, the congestion message will be received by nodes $102_1$ and $102_2$. $102_2$ will control its traffic to G and $102_1$ its traffic from A to G, but not from B to C. Thus with the help of the message an intelligent distinction can be made and unnecessary penalizing of traffic from B to C can be avoided. This also leads to better utilization of network resources.

Figure 3:
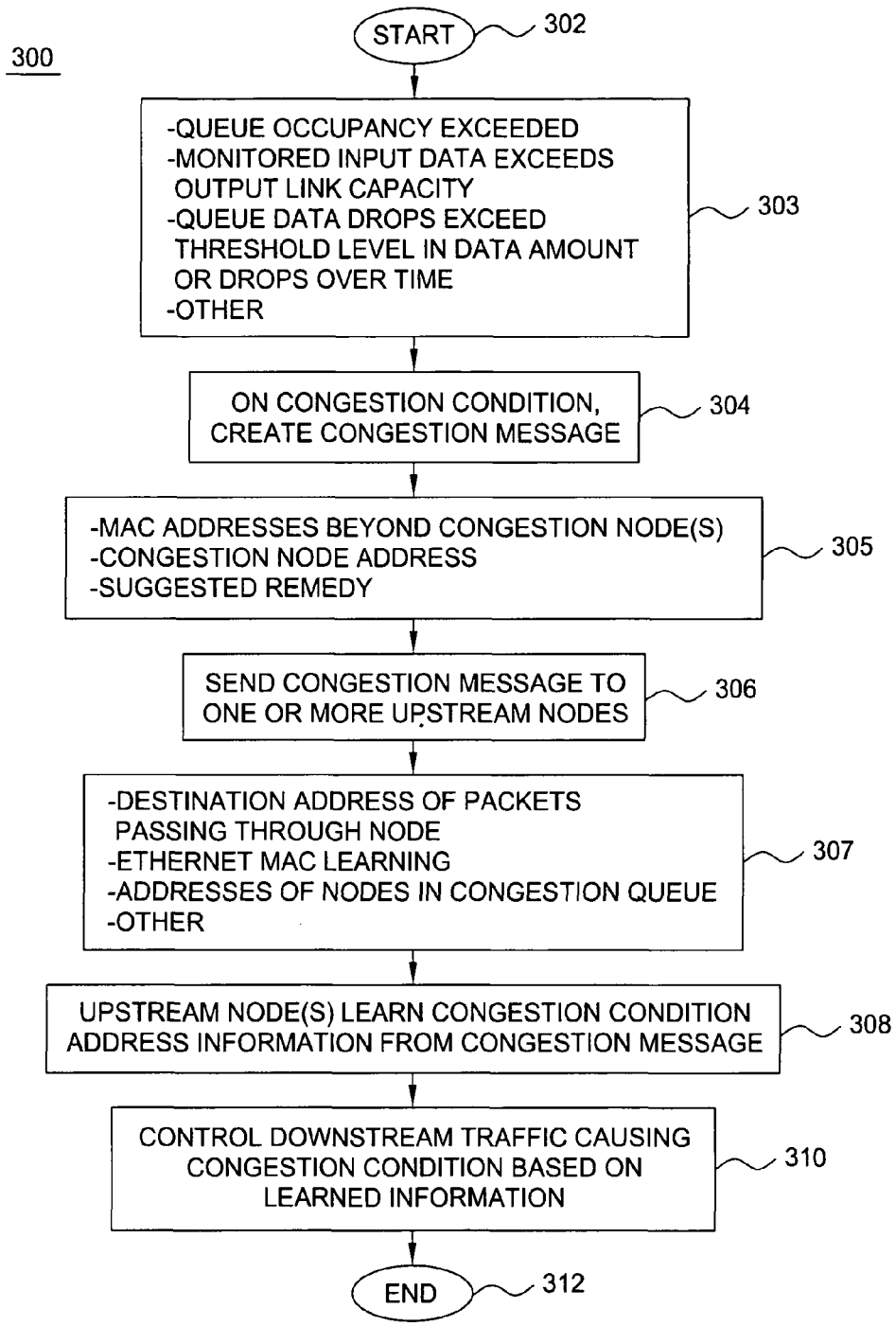
FIG. 3 depicts a flow chart for managing data flow in accordance with the subject invention.

Specifically, a method of performing congestion control in a network is depicted in FIG. 3 as a series of method steps 300. The method starts at step 302 and proceeds to step 304 where upon detection of a congestion condition at a particular node, said particular node creates a congestion message.

Referring to box 303, the congestion condition may be determined by noting a queue maximum occupancy being exceeding, by noting that monitored input data to the node exceeds the output link capability of the node, by noting that a queue data drop rate exceeds a threshold level in terms of an amount of data dropped, an amount of data dropped over time, a number of data drops over time or some other congestion indicative condition.

Referring to box 305, a congestion message may include any of the MAC address of the congestion detection node, the MAC address(es) of nodes beyond (i.e., downstream from) the congestion node, information useful in affecting a congestions reduction (e.g., alternate paths, nodes and the like). Additionally, types of traffic flows may be indicated such that prioritization of rerouted flows may be provided.

In one embodiment of the invention the a congestion message comprises a header portion and a payload portion. The payload portion comprises a destination MAC addresses or pair of MAC addresses (e.g., a source/destination pair). The header portion comprises a type of message indicator (i.e., congestion message type), such that a receiving node may properly process the congestion indication information within the payload portion. The header or payload may optionally include information indicative of an appropriate means for resolving the congestion. Once the congestion message is created, the node detecting the congestion condition sends the congestion message to one or more upstream nodes at step 306.

At step 308, one or more upstream nodes receives the congestion condition message and learns information about the congestion. Referring to box 307, the learning may comprise determining the destination address of packets passing through the congestion indicating node, the Ethernet MAC learning process, the address(es) of nodes in a congestion queue and/or other learning techniques. The upstream node receiving the congestion message then compares the addresses mentioned in the congestion message to those it has learnt on its ports. Alternatively more intelligent schemes could be applied, for example keeping track of both source and destination pairs. If the addresses indicated in the congestion message are the same as some addresses learnt on its output ports or conforms to the traffic flows it sends towards the congested node, it can rate limit this flows.

In one embodiment the invention, the congestion indicative information comprises the MAC address(es) which are creating the excessive data flow and, hence, the congestion condition. In the particular example discussed above with respect to FIGS. 1-2, the congestion information comprises, illustratively, the MAC address for the network device 106 existing at station G. In an alternate embodiment of the invention, the information may be the source and destination address pair causing the problem flow. For example, and in the example discussed above, the source and destination address pair information for the network devices 106 contained at station pairs A,G and C,G. Accordingly, when third node 102$_3$ detects this congestion condition, it will send the MAC address information for traffic from station A to station G and from station C to station G.

Once the congestion condition address information is learned, the method moves to step 310 where control of the downstream traffic causing the congestion condition occurs. Specifically, the traffic flows indicated above are controlled or otherwise limited because their specific address information (which was learned through the congestion message) is identified as the source of the congestion. Traffic flows will be limited or otherwise controlled so the link capacity at third link 104$_{3-4}$ is no longer exceeded. The method ends at step 312.

Generally speaking, an upstream node receiving the message interprets it as a congestion message by, illustratively, a type identifier in a header or payload portion of a packet structure associated with the message. From the payload of the message, the upstream node learns the addresses/pairs of the MAC addresses causing the congestion situation. The upstream node then takes action to control/reduce the congestion (or communicates with a controlling entity such as a management software layer to take actions to control/reduce the congestion).

The controlling action comprises, illustratively, dropping all or some percentage of packets destined for the MAC addresses mentioned in the congestion message (or the source destination pair). The controlling action may also be modified according to a service level agreement (SLA) associated with the congested node(s). For example, flow control may be implemented in a manner that favors certain flows such that the SLA associated with those favored flows is honored (e.g., not drop packets from favored flows). The preferential treatment of some flows may be indicated by, for example, notifying the congested node that the upstream node or controlling entity did act on its request.

In a first example, if the congestion message contains only a destination address (e.g., the address of a end-node/end-station G), then the upstream node or controlling entity may drop all or a certain percentage of packets destined for node G.

In a second example, if the congestion message contains an source/destination address pair (e.g., the address of nodes AB), then the upstream node or controlling entity may drop all or a certain percentage of packets sourced from node A that are destined for node B. If the source address is not known, then the upstream node or controlling entity may drop all or a certain percentage of packets destined for node B.

Figure 4:
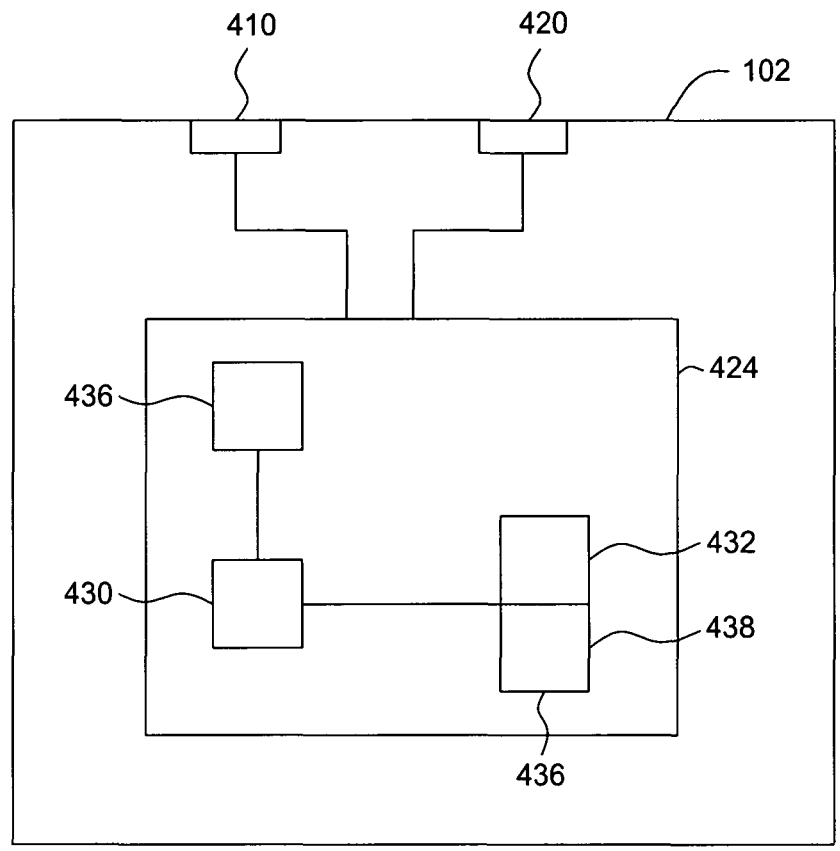
FIG. 4 depicts an apparatus operating in accordance with the subject invention.

FIG. 4 details the internal circuitry of exemplary hardware that is used to execute the above-identified method 300 of FIG. 3 in the manner described to control the flow of data in a network in accordance with the subject invention. The hardware 424 is contained within or is otherwise part of each of the devices making up the nodes 102$n$ (switches, bridges, routers and the like) as a computer or other type of processing device inside network 100. Specifically, the computing device 424 comprises at least one central processing unit (CPU) 430 connected to support circuits 434 and memory 436. The CPU 430 may comprise one or more conventionally available microprocessors. The support circuits 434 are well known circuits that comprise power supplies, clocks, input/output interface circuitry and the like. These components execute the necessary processing to move data (according to network protocol and the flow control methods of the subject invention) between an input port 410 and output port 420 of the device 102$n$.

Memory 436 may comprise random access memory, read only memory, removable disk memory, flash memory, and various combinations of these types of memory. The memory 436 is sometimes referred to as main memory and may in part be used as cache memory or buffer memory. The memory 436 stores various software packages (i.e., packages 432 and 438) that dictate the steps required to control data flow in accordance with method described above thus forming a special purpose machine for doing same when running said software packages. Alternately the software packages may be a corresponding ASIC.

Accordingly, a novel solution to network congestion is identified. By advertising the MAC addresses of data flows that are in excess of network or link capacity and subsequently controlling said traffic from points that are upstream of the identified congestion points, Ethernet traffic is now improved. Specifically, Ethernet traffic is now capable of making a distinction between different data flows and managing them according to their MAC address. Since this messaging format runs within existing Ethernet protocol, there is no additional hardware or complex messaging software that must be incorporated into an existing network to accomplish this type of traffic flow control.

Although various embodiments which incorporate the teachings of the present invention have been shown and described in detail herein, those skilled in the art can readily devise many other varied embodiments that still incorporate these teachings.

What is claimed is:

1. A method for controlling data flow in a network, comprising:

detecting a congestion condition at a network node in the network; and sending a congestion message from the network node at which the congestion condition is detected toward one or more network nodes upstream of the congestion condition;

wherein the congestion message comprises an indication that a congestion condition exists;

wherein the congestion message comprises address information of at least one end-node associated with the congestion condition to enable thereby the control of at least one data flow in a manner tending to reduce the congestion condition;

wherein the congestion message comprises a MAC address associated with a data flow to be restricted such that the congestion may be reduced or the congestion message comprises a MAC address pair associated with a data flow to be restricted such that the congestion may be reduced.

2. The method of claim 1, wherein:
the congestion condition is determined when a queue maximum occupancy is exceeded.

3. The method of claim 1, wherein:
the congestion condition is determined when data received by the network node exceeds an output link capability of the network node.

4. The method of claim 1, wherein:
the congestion condition is determined when a queue data drop rate exceeds a threshold level.

5. The method of claim 4, wherein:
the threshold level is determined with respect to at least one of an amount of data dropped, an amount of data dropped over time and a number of data drops over time.

6. The method of claim 1, wherein the MAC address pair is a source address and a destination address of a data flow contributing to the congestion condition.

7. The method of claim 6, wherein the data flow is controlled by dropping at least a portion of those packets associated with the destination address.

8. The method of claim 6, wherein the data flow is controlled by dropping at least a portion of those packets associated with the source and destination addresses.

9. The method of claim 8, wherein:
in response to the source address end-node being unknown, the data flow is controlled by dropping at least a portion of those packets associated with only the destination address.

10. The method of claim 1, wherein the controlling is performed in accordance with a Service Level Agreement associated with the at least one data flow to be controlled.

11. The method of claim 10, further comprising:
receiving an indication of an inability to drop packets in accordance with the Service Level Agreement.

12. A method for controlling data flow in a network, comprising:
detecting a congestion condition at a network node in the network; and
sending a congestion message from the network node at which the congestion condition is detected toward one or more network nodes upstream of the congestion condition;
wherein the congestion message comprises address information of at least one end-node associated with the congestion condition to enable thereby the control of at least one data flow in a manner tending to reduce the congestion condition, wherein the address information is the MAC address of a destination end-node.

13. The method of claim 12, wherein:
the congestion condition is determined when a queue maximum occupancy is exceeded.

14. The method of claim 12, wherein:
the congestion condition is determined when data received by the network node exceeds an output link capability of the network node.

15. The method of claim 12, wherein:
the congestion condition is determined when a queue data drop rate exceeds a threshold level.

16. The method of claim 15, wherein:
the threshold level is determined with respect to at least one of an amount of data dropped, an amount of data dropped over time and a number of data drops over time.

17. The method of claim 12, wherein the MAC address pair is a source address and a destination address of a data flow contributing to the congestion condition.

18. The method of claim 17, wherein the data flow is controlled by dropping at least a portion of those packets associated with the destination address.

19. The method of claim 17, wherein the data flow is controlled by dropping at least a portion of those packets associated with the source and destination addresses.

20. The method of claim 19, wherein:
in response to the source address end-node being unknown, the data flow is controlled by dropping at least a portion of those packets associated with only the destination address.

21. The method of claim 12, wherein the controlling is performed in accordance with a Service Level Agreement associated with the at least one data flow to be controlled.

22. The method of claim 21, further comprising:
receiving an indication of an inability to drop packets in accordance with the Service Level Agreement.

23. An apparatus configured for controlling data flow in a network, the apparatus comprising:
a processor and a memory communicatively connected to the processor, the processor configured to:
detect a congestion condition at a network node in the network; and
send a congestion message from the network node at which the congestion condition is detected toward one or more network nodes upstream of the congestion condition;
wherein the congestion message comprises an indication that a congestion condition exists;
wherein the congestion message comprises address information of at least one end-node associated with the congestion condition to enable thereby the control of at least one data flow in a manner tending to reduce the congestion condition;
wherein the congestion message comprises a MAC address associated with a data flow to be restricted such that the congestion may be reduced or the congestion message comprises a MAC address pair associated with a data flow to be restricted such that the congestion may be reduced.

24. An apparatus configured for controlling data flow in a network, the apparatus comprising:
a processor and a memory communicatively connected to the processor, the processor configured to:
detect a congestion condition at a network node in the network; and
send a congestion message from the network node at which the congestion condition is detected toward one or more network nodes upstream of the congestion condition;
wherein the congestion message comprises address information of at least one end-node associated with the congestion condition to enable thereby the control of at least one data flow in a manner tending to reduce the congestion condition, wherein the address information is the MAC address of a destination end-node.

* * * * *